US005934025A

United States Patent [19]

[11] Patent Number: 5,934,025
[45] Date of Patent: Aug. 10, 1999

Trap et al.

[54] DOOR HANDLE ASSEMBLY

[75] Inventors: Todd Trap, Kentwood; Richard T. Young, Lowell; Robert Dault, Perrysburg, all of Mich.

[73] Assignee: ADAC Plastics, Inc., Grand Rapids, Mich.

[21] Appl. No.: 09/034,560

[22] Filed: Mar. 3, 1998

Related U.S. Application Data

[62] Division of application No. 08/674,888, Jul. 3, 1996, Pat. No. 5,758,454.

[51] Int. Cl.[6] ........ B60J 5/04
[52] U.S. Cl. ........ 49/502; 49/460
[58] Field of Search ........ 49/502, 503, 506, 49/460; 16/124; 403/393, 353, 316

[56] References Cited

U.S. PATENT DOCUMENTS

| | | | |
|---|---|---|---|
| 1,505,380 | 8/1924 | Dexter . | |
| 3,117,339 | 1/1964 | Vigna | 16/124 |
| 3,273,844 | 9/1966 | Hodson et al. | 248/217 |
| 3,710,972 | 1/1973 | Barry | 220/3.6 |
| 3,848,764 | 11/1974 | Salg | 220/3.6 |
| 4,063,660 | 12/1977 | Ware | 220/3.6 |
| 4,165,944 | 8/1979 | Sunasky | 403/353 X |
| 4,363,420 | 12/1982 | Andrews | 220/307 |
| 4,438,964 | 3/1984 | Peters | 292/216 |
| 4,536,904 | 8/1985 | Whitehead | 403/316 X |
| 4,949,508 | 8/1990 | Elton | 49/502 |
| 5,355,554 | 10/1994 | Magoon | 16/124 |
| 5,758,454 | 6/1998 | Trap et al. | 49/506 |

*Primary Examiner*—Jerry Redman
*Attorney, Agent, or Firm*—Young & Basile, P.C.

[57] ABSTRACT

A method of attaching a vehicle door handle to the outer skin of a vehicle door, and a door handle assembly to facilitate such attachment. The door skin is provided with a pair of apertures and a plurality of lugs are provided on an inner planar face of the door handle assembly together with a spring clip proximate one end of the planar surface. The door handle is mounted on the door by passing the lugs through the apertures while deflecting the spring clip inwardly and thereafter sliding the door handle assembly over the door skin to move web portions on the lugs into wedging engagement with respective edge portions of the apertures while moving the spring clip into latching engagement with a transverse edge portion of one of the apertures. Flange portions on the lugs are simultaneously positioned beneath respective inner surfaces on the skin to complete the attachment of the door handle to the skin.

9 Claims, 3 Drawing Sheets

FIG-1
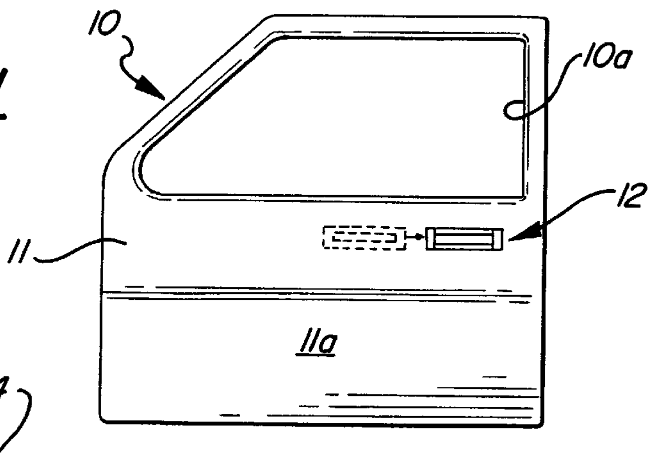
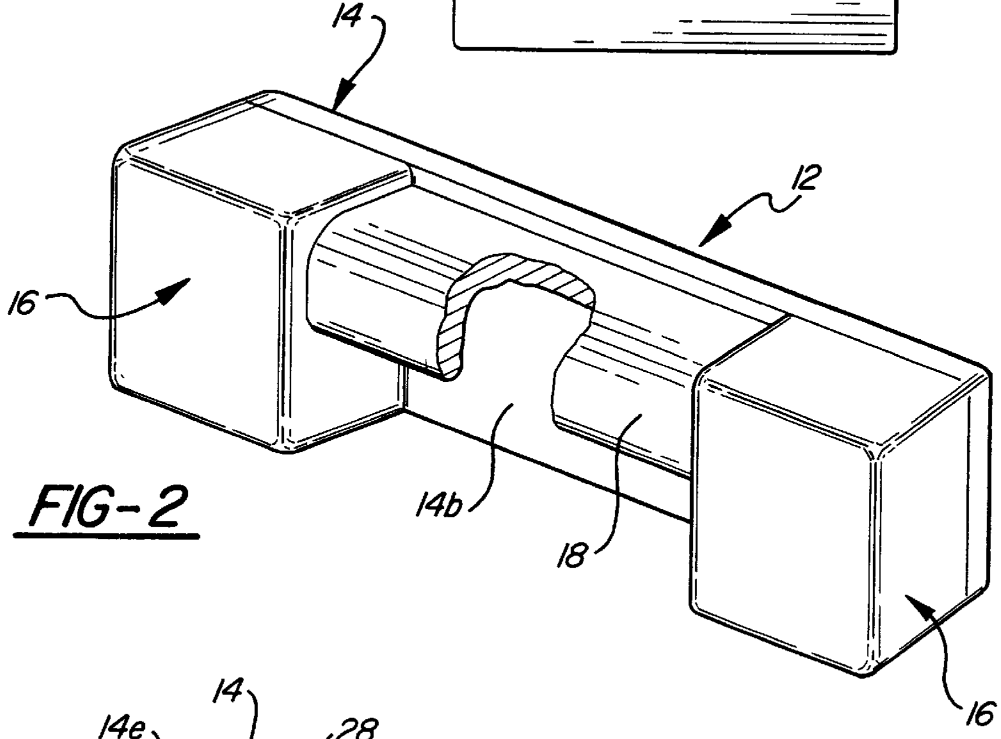
FIG-2
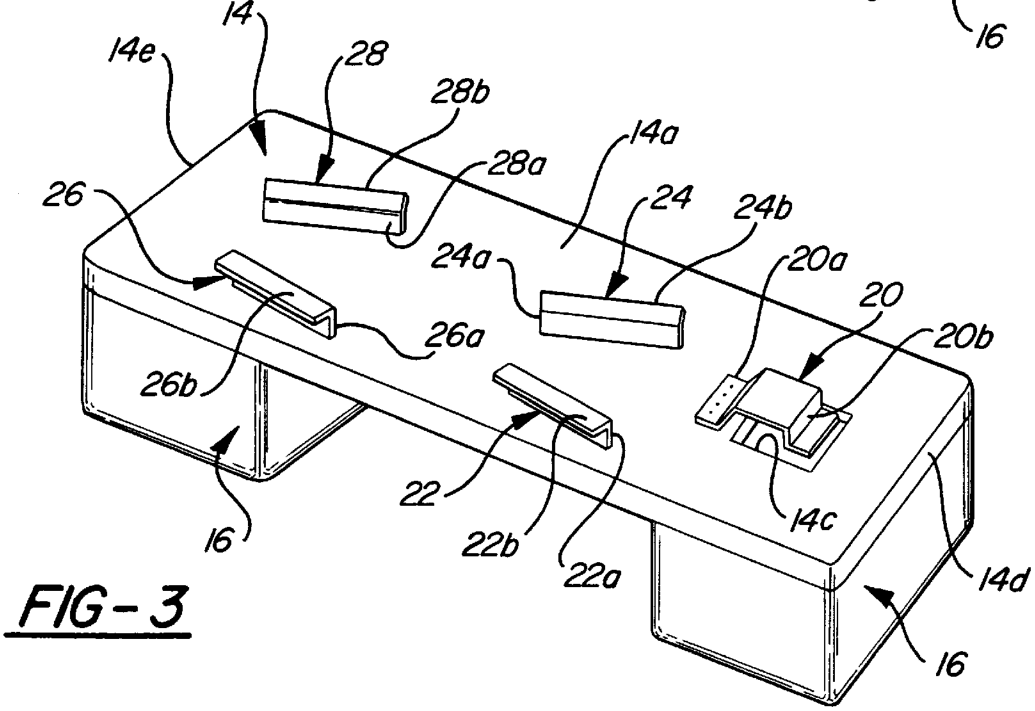
FIG-3

DOOR HANDLE ASSEMBLY

CROSS REFERENCE TO RELATED PATENTS

This application is a division of U.S. Pat. No. 5,758,454 filed on Jul. 3, 1996, entitled DOOR HANDLE ASSEMBLY, the contents of which are incorporated herein by reference.

BACKGROUND OF THE INVENTION

This invention relates to door handle assemblies, more particularly to motor vehicle door handle assemblies, and yet more particularly to a method of attaching a motor vehicle door handle assembly to the associated motor vehicle door structure.

Motor vehicles typically include one or more doors providing access to the interior of the vehicle and at least one door handle assembly mounted on an exterior surface or skin of each door to control the opening and closing of the door. The door handle assemblies are typically attached to the associated door utilizing various fastener mechanisms. Although the fastener mechanisms are effective in securing the door handle assembly to the door, they require that a considerable amount of high priced labor be expended in attaching each door handle assembly to each associated door.

SUMMARY OF THE INVENTION

This invention is directed to the provision of an improved door handle assembly structure.

The assembled structure of the invention includes a door handle assembly including a planar surface; an outer door skin having an aperture defined by edge means; a lug on the planar surface sized to pass through the aperture means and defining a web portion extending outwardly from the planar surface and a flange portion rigid with the web portion and spaced outwardly from the planar surface by at least the thickness of the outer door skin at the aperture means; and a spring clip device on the assembly biased outwardly from the planar surface and including a latching free edge. The planar surface is juxtaposed to an outer surface of the outer door skin with the lug passing through the aperture means, the lug web portion engaging a first portion of the edge means, the flange portion positioned beneath an inner surface of the outer door skin proximate the first portion of the edge means, and the free edge of the spring clip device latchingly engaging a second portion of the edge means. This structure is amenable to the rapid and inexpensive attachment of an door handle assembly to a outer door skin.

In the disclosed embodiment of the assembled structure of the invention the aperture means is defined by a first aperture defined by a first closed loop edge and a second aperture defined by a second closed loop edge; two pairs of lugs are provided on the planar surface; the lugs of the first pair coact with first and second portions of the first closed loop edge and the lugs of the second pair coact with first and second portions of the second closed loop edge. The assembled structure is particularly amenable to the attachment of a motor vehicle door handle assembly to the outer skin of the door of a motor vehicle.

BRIEF DESCRIPTION OF THE DRAWINGS

FIG. 1 is a view of a motor vehicle door including a door handle assembly according to the invention;

FIGS. 2 and 3 are detail views of the door handle assembly;

DETAILED DESCRIPTION OF THE PREFERRED EMBODIMENT

Figure 5:
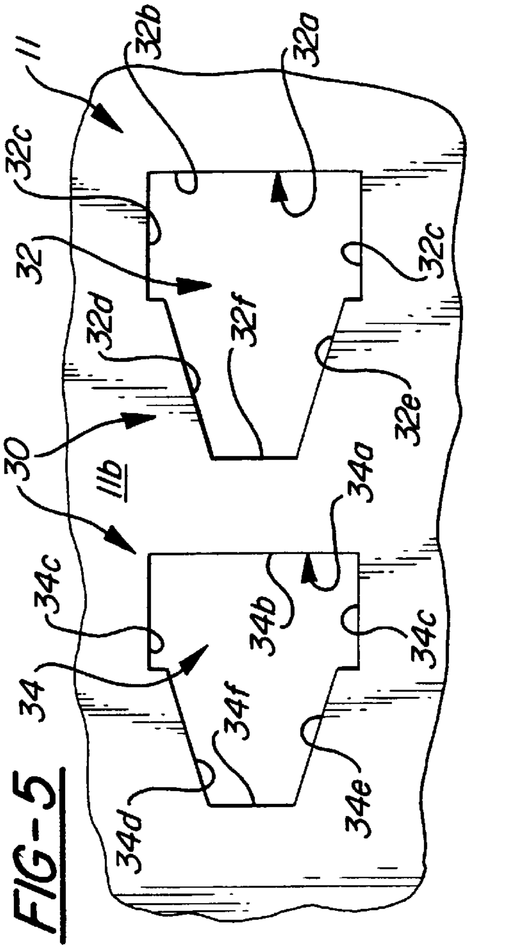
FIG. 5 is a fragmentary view showing the outer skin of the door.
Figure 4:
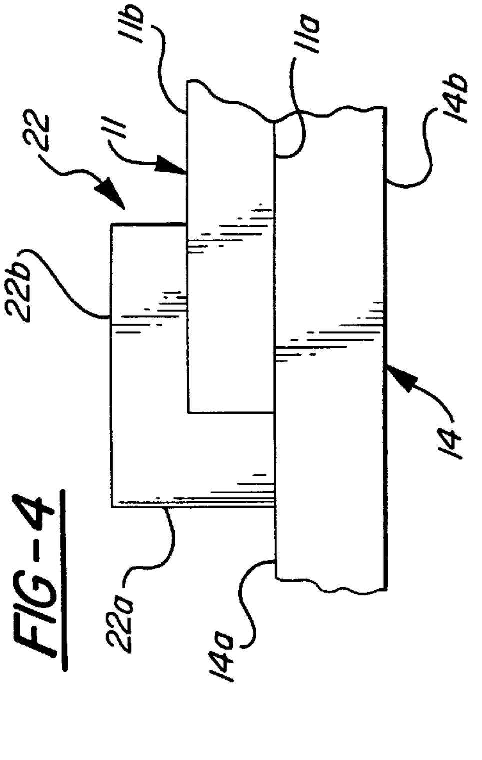
FIG. 4 is a detail view of a lug embodied in the door handle assembly.

The motor vehicle door 10 seen in FIG. 1 includes a window opening 10*a* and an outer door skin 11 having an outer face 11*a* and an inner face 11*b*. A door handle assembly 12, constructed in accordance with the invention, is adapted to be attached to the outer skin 11 of the door.

Door handle assembly 12 includes a base plate 14, end posts 16, and a handle member 18.

Base plate 14 has a generally planar configuration and includes a planar inner face 14*a* and a planar outer face 14*b*.

Posts 16 upstand from base plate outer face 14*b* proximate opposite ends of the base plate.

Handle member 18 is pivotally mounted between posts 16 and has an L-configuration to facilitate grasping and pivoting of the handle member so as to operate, in known manner, an associated latching mechanism for opening and closing the door.

An aperture 14*c* is provided in base plate 14 proximate the front end 14*d* of the base plate and a spring clip device 20 is positioned on the inner face 14*a* of base plate 14 in association with aperture 14. Spring clip device 20 is formed of a suitable spring steel, is secured to face 14*a* by clip portion 20*a*, has a U-configuration in longitudinal cross-section, and defines a latching free end or edge 20*b*.

A plurality of lugs 22, 24, 26 and 28 are provided on, and suitably rigidly secured to, the inner face 14*a* of the base plate 14. Each lug has an L-shaped cross-sectional configuration and defines a web portion 22*a*, 24*a*, 26*a*, 28*a* extending outwardly from the planar surface 14*a* and a flange portion 22*b*, 24*b*, 26*b*, 28*b* rigid with the respective web portion and spaced outwardly from the planar surface 14*a* by approximately the thickness of outer door skin 11. The lugs are arranged in pairs with one pair 26, 28 positioned proximate the rear end 14*e* of the base plate and a second pair 22, 24 positioned between the first pair and the clip 20. The web portions 24*a*, 22*a* of pair 22, 24 converge rearwardly toward each other and the web portions 26*a*, 28*a* of pair 26, 28 converge rearwardly toward each other.

Spring clip device 20 and lugs 22, 24, 26, and 28 are adapted to coact with aperture means 30 provided in outer door skin 11 to attach the door handle assembly to the door skin. Aperture means 30 is constituted by a front aperture 32 and a rear aperture 34 defined respectively by a closed loop edge 32*a* and a closed loop edge 34*a*.

Closed loop edge 32*a* includes a transverse front edge portion 32*b*, parallel longitudinal side edge portions 32*c*, rearwardly converging edge portions 32*d* and 32*e*, and a rear transverse edge portion 32*f*.

Closed loop edge 34*a* includes a transverse front edge portion 34*b*, parallel longitudinal side edge portions 34*c*, rearwardly converging edge portions 34*d* and 34*e*, and a rear transverse edge portion 34*f*.

Aperture edges 32*d*, 32*e* are obliquely angled with respect to transverse front edge portion 32*b* and converge at an angle corresponding to the angle of convergence of lug web portions 22*a*, 24*a* and aperture edges 34*d*, 34*e* and obliquely angled with respect to transverse front edge portion 34*b* and converge at an angle corresponding to the angle of convergence of lug web portions 26*a*, 28*a*.

Figures 7, 8, 9, 10:
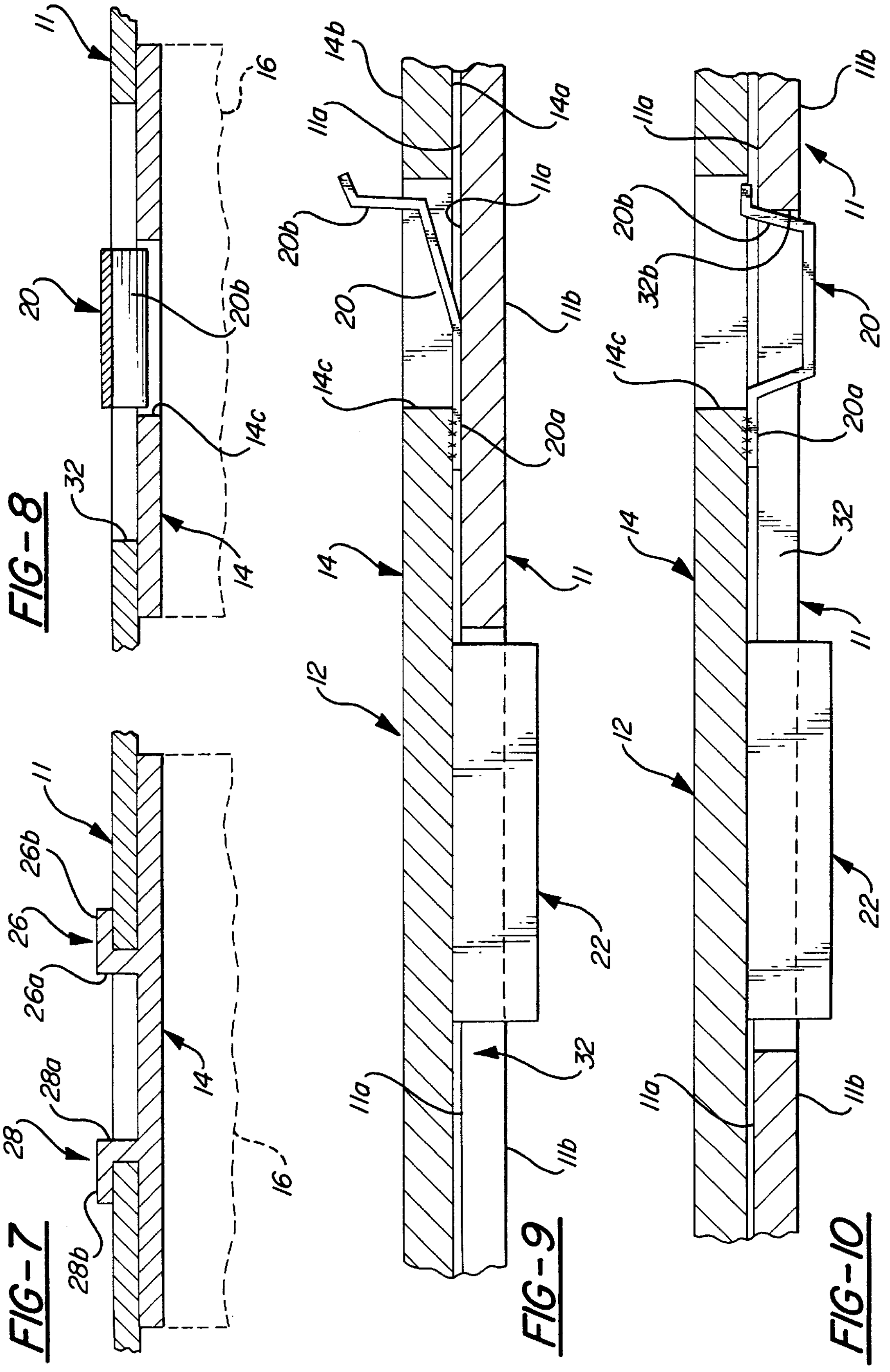
FIGS. 7 and 8 are cross-sectional views taken respectively on line 7—7 and 8—8 of FIG. 6.
FIGS. 9 and 10 are sequential, fragmentary views showing steps in the process of attaching the door handle assembly to the outer door skin.

In order to attach door handle assembly 12 to the outer skin 11 of door 10, and as best seen in sequential FIGS. 9 and 10, door handle assembly 12 is placed proximate door skin 11 with the inner planar surface 14*a* of base plate 14 juxtaposed to the outer planar surface ll*a* of the skin, lugs 22 and 24 passing through aperture 32, lugs 26 and 28 passing through aperture 34, and spring clip device 20 biased upwardly or inwardly into aperture 14*c* so as to allow planar face 14*a* to be juxtaposed to skin outer face ll*a*. The assembly 10 is thereafter moved in a parallel direction relative to the skin as for example from the dash line position in FIG. 1 to the solid line position in FIG. 1. As the handle assembly is moved over and parallel to the skin, the free end 20*b* of the spring clip snaps into latching engagement with the transverse front edge 32*b* of aperture 32; converging web portions 22*a* and 24*a* of lugs 22, 24 move into wedging engagement with converging aperture edge portions 32*d* and 32*e*, respectively; lug flange portions 22*b* and 24*b* move beneath the inner surface 11*b* of the skin proximate the edge portions 32*d* and 32*e*, respectively; converging web portions 26*a*, 28*a* of lugs 26, 28 move into wedging engagement with converging aperture edge portions 34*d*, 34*e*, respectively; and lug flange portions 26*b*, 28*b* move beneath the inner surface 11*b* of the skin proximate the edge portions 34*d*, 34*e*, respectively.

Figure 6:
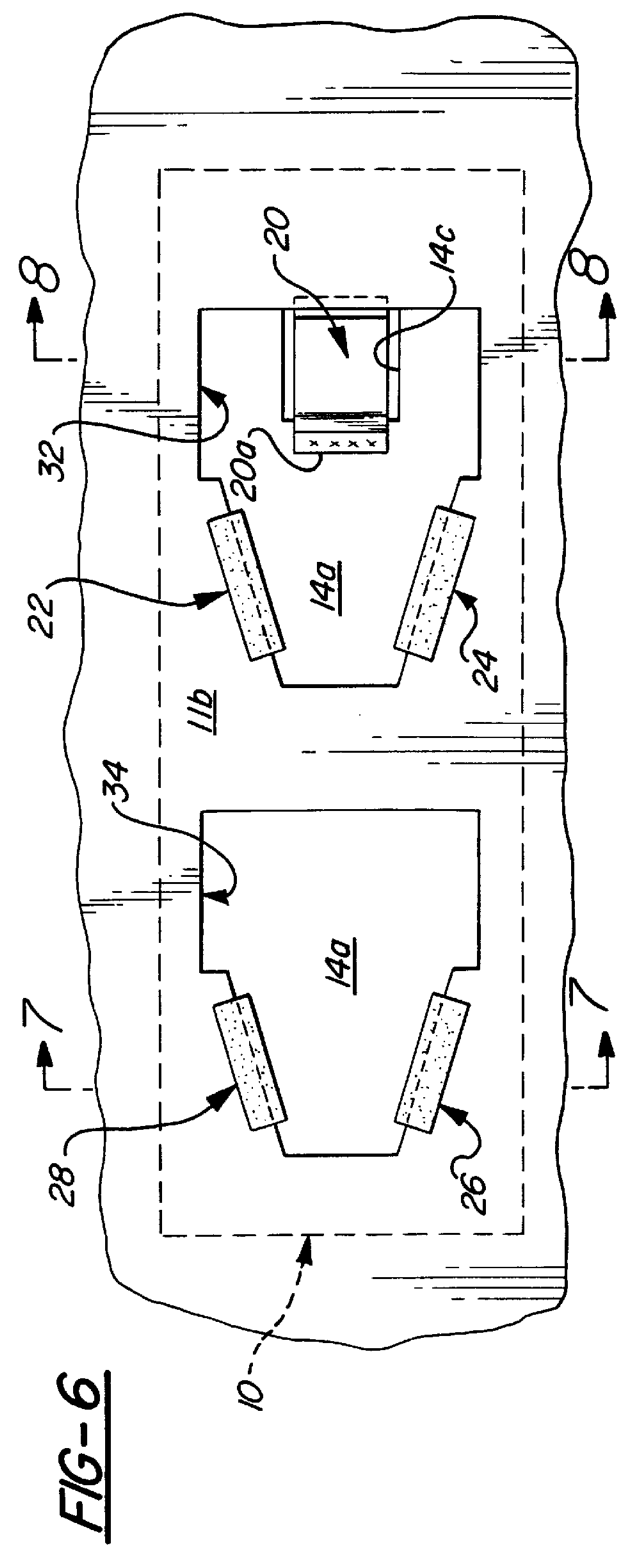
FIG. 6 is a fragmentary view looking outwardly from the interior of the outer door skin and showing the door handle assembly attached to the outer skin.

In one simple swiping movement of the door handle assembly over the door skin, the door handle assembly will be seen to be firmly and positively attached to the door skin, thereby minimizing the amount of time and labor required to mount the door handle assembly on the door skin and ensuring a firm, positive, locking attachment of the door handle assembly to the door skin. In the mounted configuration of the door handle assembly on the door skin (FIG. 6), rearward movement of the door handle assembly relative to the skin is precluded by engagement of converging lugs 26*a*, 28*a* with converging surfaces 34*d*, 34*e* and by the engagement of converging lugs 22*a*, 24*a* with converging edge portions 32*d*, 32*e*; forward movement of the door handle assembly relative to the skin is precluded by engagement of latch free end 20*b* with the front transverse edge 32*b* of front aperture 32; outward movement of the door handle assembly relative to the skin is precluded by engagement of the flange portions of the lugs with the adjacent surfaces of the inner skin surface 11*b*, and up and down movement of the door handle assembly relative to the skin is precluded by the combined action of the lug web portions against the adjacent aperture edge portions and the engagement of the clip free end portion 20*b* with the front transverse edge 32*b* of aperture 32.

Removal of the door handle assembly from the door skin cannot be achieved from outside of the door but rather can be readily achieved by a suitable tool inserted into the interior of the door behind the outer skin to move the clip 20 outwardly and free the clip free end 20*b* from engagement with edge 32*b*, whereafter the door handle assembly may be slid forwardly to disengage the lugs from the respective aperture surfaces and allow separation of the door handle assembly from the door.

The invention methodology will be seen to provide a rapid and efficient means of attaching an assembly to a related structure and, specifically, will be seen to provide a methodology for attaching a door handle assembly to the outer skin of a door with a minimum of labor.

Whereas a preferred embodiment of the invention has been illustrated and described in detail, it will be apparent that various changes may be made in the disclosed embodiment without departing from the scope or spirit of the invention.

We claim:

1. A motor vehicle door structure comprising:

A motor vehicle door handle assembly including a base plate member defining a planar surface;

an outer door skin having aperture means defined by edge means;

a lug on the planar surface sized to pass through the aperture means and defining a web portion extending outwardly from the planar surface and a flange portion rigid with the web portion and spaced outwardly from the planar surface by at least the thickness of the outer door skin at the aperture means; and a spring clip device on the door handle assembly biased outwardly from the planar surface and including a latching free edge;

the planar surface being juxtaposed to an outer surface of the outer door skin with the lug passing through the aperture means, the web portion engaging a first portion of the edge means, the flange portion positioned beneath an inner surface of the outer door skin proximate the first portion of the edge means, and the free edge of the spring clip device latchingly engaging a second portion of the edge means.

2. A structure according to claim 1 wherein the first portion of the edge means is angled with respect to the second portion of the edge means.

3. A structure according to claim 2 wherein the first portion of the edge means is oblique with respect to the second portion of the edge means.

4. A structure according to claim 1 wherein:

the lug comprises a first lug defining a first web portion and a first flange portion; and the door handle assembly further includes a second lug on the planar surface sized to pass through the aperture means and defining a second web portion extending outwardly from the planar surface and a second flange portion rigid with the second web portion and spaced outwardly from the planar surface by at least the thickness of the outer door skin at the aperture means;

both lugs passing through the aperture means with the first web portion engaging the first portion of the edge means, the first flange portion positioned beneath the inner surface of the outer door skin proximate the first portion of the edge means, the free edge of the spring clip latchingly engaging the second portion of the edge means, the second web portion engaging a third portion of the edge means, and the second flange portion positioned beneath the inner surface of the sheet member proximate the third portion of the edge means.

5. A structure according to claim 4 wherein the first and third portions of the edge means are each angled with respect to the first portion of the edge means.

6. A structure according to claim 5 wherein the first and second web portions converge and the first and second portions of the edge means correspondingly converge.

7. A structure according to claim 4 wherein:

third and fourth lugs are provided on the planar surface sized to pass through the aperture means, the third lug including a third web portion extending outwardly from the planar surface and a third web portion rigid with the third web portion and spaced outwardly from the planar surface by at least the thickness of the outer door skin at the second aperture means, the fourth lug including a fourth web portion extending outwardly from the planar surface and a fourth flange portion rigid with the fourth web portion and spaced outwardly from the planar surface by at least the thickness of the outer door skin at the aperture means;

the lugs passing through the aperture means, the third web portion engaging a third portion of the edge means, the third flange portion positioned beneath the inner surface of the outer door skin proximate the third portion of the edge means, the fourth web portion engaging a fourth portion of the edge means, and the fourth flange portion positioned beneath the inner surface of the sheet metal proximate the fourth portion of the edge means.

8. An assembled structure according to claim 1 wherein:

the aperture means comprises an aperture defined by a closed loop edge; and the first and second edge means portions are defined by first and second portions of the closed loop edge.

9. A motor vehicle door structure comprising:

an outer door skin having aperture means defined by edge means;

a door handle assembly including a handle member and a base plate defining a planar surface;

a lug on the planar surface sized to pass through the aperture means and defining a web portion extending outwardly from the planar surface and a flange portion rigid with the web portion and spaced outwardly from the planar surface by at least the thickness of the skin at the aperture means; and a spring clip device on the base plate biased outwardly from the planar surface and including a latching free edge;

the planar surface being juxtaposed to the outer skin of the door with the lug passing through the aperture means, the lug web portion engaging a first portion of the edge means, the flange portion positioned beneath an inner surface of the outer door skin proximate the first portion of the edge means, and the free edge of the spring clip latchingly engaging a second portion of the edge means.

* * * * *